US010991371B2

(12) United States Patent
Pan

(10) Patent No.: US 10,991,371 B2
(45) Date of Patent: Apr. 27, 2021

(54) VOICE FUNCTION CONTROL METHOD AND APPARATUS

(71) Applicant: Advanced New Technologies Co., Ltd., Grand Cayman (KY)

(72) Inventor: Shen Pan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/820,098

(22) Filed: Mar. 16, 2020

(65) Prior Publication Data
US 2020/0219510 A1 Jul. 9, 2020

Related U.S. Application Data

(63) Continuation of application No. 16/447,536, filed on Jun. 20, 2019, now Pat. No. 10,643,615, which is a (Continued)

(30) Foreign Application Priority Data

Mar. 31, 2017 (CN) .......................... 201710210831.5

(51) Int. Cl.
*G10L 15/22* (2006.01)
*G10L 15/08* (2006.01)
(Continued)

(52) U.S. Cl.
CPC .............. *G10L 15/22* (2013.01); *G06F 3/167* (2013.01); *G10L 15/08* (2013.01); *G10L 15/26* (2013.01);
(Continued)

(58) Field of Classification Search
CPC ....... G10L 15/22; G10L 15/32; G10L 15/265; G10L 15/08; G10L 2015/088; G10L 2015/223; G06F 3/167
(Continued)

(56) References Cited

U.S. PATENT DOCUMENTS 8,571,937 B2 * 10/2013 Rose .................. G06Q 30/0207
705/16
8,904,401 B2 * 12/2014 Kim ..................... G06F 3/04817
718/104
(Continued)

FOREIGN PATENT DOCUMENTS

CN 103219005 7/2013
CN 103915095 7/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Akwasi M Sarpong
(74) *Attorney, Agent, or Firm* — Fish & Richardson P.C.

(57) ABSTRACT

A first recognition result of an input voice is generated, where the input voice is input by a user of a terminal, and the first recognition result is generated by a voice assistant of the terminal. An application of the terminal is determined based on the first recognition result, where the application provides a service, and the application is different from the voice assistant. The input voice is passed to the application, where the application performs voice recognition on the input voice to generate a second recognition result. The service is provided to the user based on the second recognition result.

17 Claims, 7 Drawing Sheets

Related U.S. Application Data continuation of application No. PCT/CN2018/080436, filed on Mar. 26, 2018.

(51) Int. Cl.
*G10L 15/26* (2006.01)
*G10L 15/32* (2013.01)
*G06F 3/16* (2006.01)

(52) U.S. Cl.
CPC ........ *G10L 15/32* (2013.01); *G10L 2015/088* (2013.01); *G10L 2015/223* (2013.01)

(58) Field of Classification Search
USPC .................. 704/251, 275, 231, 226, 215
See application file for complete search history.

(56) References Cited

U.S. PATENT DOCUMENTS

| | | | |
|---|---|---|---|
| 9,122,981 B1* | 9/2015 | Pope | G06Q 30/0609 |
| 9,134,972 B2* | 9/2015 | Kinoshita | G06F 8/38 |
| 9,292,307 B2* | 3/2016 | Yamamoto | G06F 9/451 |
| 9,697,822 B1 | 7/2017 | Naik et al. | |
| 9,824,207 B1* | 11/2017 | Kane-Parry | G06F 21/46 |
| 9,830,328 B2* | 11/2017 | Faith | G06F 16/164 |
| 10,643,615 B2 | 5/2020 | Pan | |
| 2004/0098253 A1* | 5/2004 | Balentine | G10L 15/22 |
| | | | 704/215 |
| 2007/0174214 A1* | 7/2007 | Welsh | G06Q 20/4016 |
| | | | 705/405 |
| 2008/0079566 A1 | 4/2008 | Singh et al. | |
| 2008/0082332 A1 | 4/2008 | Mallett et al. | |
| 2011/0054894 A1* | 3/2011 | Phillips | G10L 15/30 |
| | | | 704/235 |
| 2011/0054895 A1* | 3/2011 | Phillips | G10L 15/075 |
| | | | 704/235 |
| 2012/0016678 A1 | 1/2012 | Gruber et al. | |
| 2012/0022876 A1 | 1/2012 | LeBeau et al. | |
| 2012/0035908 A1 | 2/2012 | Lebeau et al. | |
| 2012/0035931 A1 | 2/2012 | LeBeau et al. | |
| 2012/0035932 A1 | 2/2012 | Jitkoff et al. | |
| 2012/0084086 A1 | 4/2012 | Gilbert et al. | |
| 2012/0108221 A1 | 5/2012 | Thomas et al. | |
| 2012/0136572 A1 | 5/2012 | Norton | |
| 2012/0158422 A1 | 6/2012 | Burnham et al. | |
| 2012/0173464 A1 | 7/2012 | Tur et al. | |
| 2012/0185237 A1 | 7/2012 | Gajic et al. | |
| 2012/0221339 A1 | 8/2012 | Wang et al. | |
| 2012/0245719 A1 | 9/2012 | Story, Jr. et al. | |
| 2012/0265528 A1 | 10/2012 | Gruber et al. | |
| 2012/0271625 A1 | 10/2012 | Bernard | |
| 2012/0271676 A1 | 10/2012 | Aravamudan et al. | |
| 2012/0296649 A1 | 11/2012 | Bansal et al. | |
| 2012/0310649 A1 | 12/2012 | Cannistraro et al. | |
| 2012/0310652 A1 | 12/2012 | O'Sullivan | |
| 2012/0311585 A1 | 12/2012 | Gruber et al. | |
| 2012/0330660 A1 | 12/2012 | Jaiswal | |
| 2013/0006633 A1 | 1/2013 | Grokop et al. | |
| 2013/0080167 A1 | 3/2013 | Mozer | |
| 2013/0086510 A1* | 4/2013 | Lee | G06F 3/0489 |
| | | | 715/781 |
| 2013/0115927 A1 | 5/2013 | Gruber et al. | |
| 2013/0238326 A1* | 9/2013 | Kim | G10L 15/22 |
| | | | 704/231 |
| 2013/0332162 A1* | 12/2013 | Keen | G06F 40/10 |
| | | | 704/235 |
| 2014/0222436 A1 | 8/2014 | Binder et al. | |
| 2014/0244253 A1 | 8/2014 | Bringert et al. | |
| 2014/0343950 A1* | 11/2014 | Simpson | G10L 15/22 |
| | | | 704/275 |
| 2015/0023481 A1* | 1/2015 | Wu | H04M 3/4936 |
| | | | 379/88.02 |
| 2015/0254057 A1 | 9/2015 | Klein et al. | |
| 2016/0042748 A1 | 2/2016 | Jain et al. | |
| 2016/0171980 A1 | 6/2016 | Liddell et al. | |
| 2016/0293164 A1 | 10/2016 | Shi et al. | |
| 2016/0295314 A1 | 10/2016 | Jaques et al. | |
| 2016/0371054 A1 | 12/2016 | Beaumont et al. | |
| 2017/0046115 A1 | 2/2017 | Rahardjo et al. | |
| 2017/0083285 A1 | 3/2017 | Meyers et al. | |
| 2019/0304461 A1 | 10/2019 | Shen | |

FOREIGN PATENT DOCUMENTS

| | | |
|---|---|---|
| CN | 104346151 | 2/2015 |
| CN | 204390737 | 6/2015 |
| CN | 105094717 | 11/2015 |
| CN | 105183422 | 12/2015 |
| CN | 105719649 | 6/2016 |
| CN | 105825851 | 8/2016 |
| CN | 107122179 | 9/2017 |
| JP | 2000076040 | 3/2000 |
| JP | 2013174644 | 9/2013 |
| JP | 2016095383 | 5/2016 |
| KR | 20130035983 | 4/2013 |
| KR | 20160001965 | 1/2016 |
| TW | 1557599 | 11/2016 |
| WO | WO 2015117448 | 8/2015 |
| WO | WO 2016025128 | 2/2016 |
| WO | WO 2016160852 | 10/2016 |

OTHER PUBLICATIONS

Extended European Search Report in European Application No. 18778228.9, dated Nov. 29, 2019, 8 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/080436, dated Jun. 29, 2018, 9 pages (with partial English translation).

* cited by examiner

VOICE FUNCTION CONTROL METHOD AND APPARATUS

CROSS-REFERENCE TO RELATED APPLICATIONS

This application is a continuation of U.S. patent application Ser. No. 16/447,536, filed on Jun. 20, 2019, which is a continuation of PCT Application No. PCT/CN2018/080436, filed on Mar. 26, 2018, which claims priority to Chinese Patent Application No. 201710210831.5, filed on Mar. 31, 2017, and each application is hereby incorporated by reference in its entirety.

TECHNICAL FIELD

The present application relates to the field of network communications technologies, and in particular, to a voice function control method and apparatus.

BACKGROUND

A voice assistant is software running on a terminal, and can communicate with a user by voice and assist the user to implement various functions specified by the user, such as information searching and terminal operating. Since Apple launched the voice assistant Siri, users pay more attention to the voice assistant field and more frequently use a voice assistant software type, which helps development of the voice assistant.

Currently, the voice assistant can be combined with an application program installed in the terminal. A user sends an instruction for executing a certain task to the voice assistant, and the voice assistant invokes a corresponding application program to complete the task. It greatly enriches functions that can be completed by the user by using the voice assistant as a single entry.

In the existing technology, Siri is used as an example. Siri can cooperate with six types of application programs (taxi hailing, communication, photo searching, payment transactions, network phone, and fitness). When receiving voice input of a user, Siri determines an intention of the user, and determines whether to process the intention or invoke an application program to process the intention. If Siri determines to invoke the application program, Siri extracts related information from a result of user voice recognition generated by Siri, and provides the related information for the application program. The application program implements a function specified in the information based on the information provided by Siri.

It can be learned that the information provided by Siri is a basis for correctly completing a task specified by the user. When Siri cannot accurately identify the input voice, it is difficult for the user to achieve a satisfactory level of function control by voice.

SUMMARY

In view of the previous descriptions, the present application provides a voice function control method. The voice function control method is applied to a voice assistant of a terminal, and includes: determining an associated application program based on a result of recognizing an input voice of a user, where the associated application program is configured to implement a function to be used by the user; and passing the input voice of the user to the associated application program, so that the associated application program recognizes the input voice of the user, and implements the function based on a recognition result.

The present application provides a voice function control method. The voice function control method is applied to a terminal application program configured to implement another function different from a voice assistant, and includes: receiving an input voice of a user from a voice assistant; and recognizing the input voice of the user, and implementing a function to be used by the user based on a recognition result.

The present application further provides a voice function control apparatus. The voice function control apparatus is applied to a voice assistant of a terminal, and includes: an associated application program unit, configured to determine an associated application program based on a result of recognizing an input voice of a user, where the associated application program is configured to implement a function to be used by the user; and an input voice passing unit, configured to pass the input voice of the user to the associated application program, so that the associated application program recognizes the input voice of the user, and implements the function based on a recognition result.

The present application provides a voice function control apparatus. The voice function control apparatus is applied to a terminal application program configured to implement another function different from a voice assistant, and includes: an input voice receiving unit, configured to receive an input voice of a user from a voice assistant; and a function implementation unit, configured to recognize the input voice of the user, and implement a function to be used by the user based on a recognition result.

It can be learned from the previous technical solutions that, in the implementations of the present application, after determining the associated application program based on the result of recognizing the input voice of the user, the voice assistant passes the input voice of the user to the associated application program, and the associated application program recognizes the input voice and then executes a user instruction. Each associated application program is applied to a dedicated field. For example, the Gaode map application program is applied to the map and navigation field. Therefore, in most cases, voice recognition accuracy of the associated application program in a function type that the associated application program belongs to is higher than accuracy of the voice assistant that is common to all function types, so that the function required by the user can be more accurately and quickly completed, thereby improving voice function control efficiency.

DESCRIPTION OF IMPLEMENTATIONS

Figure 1:
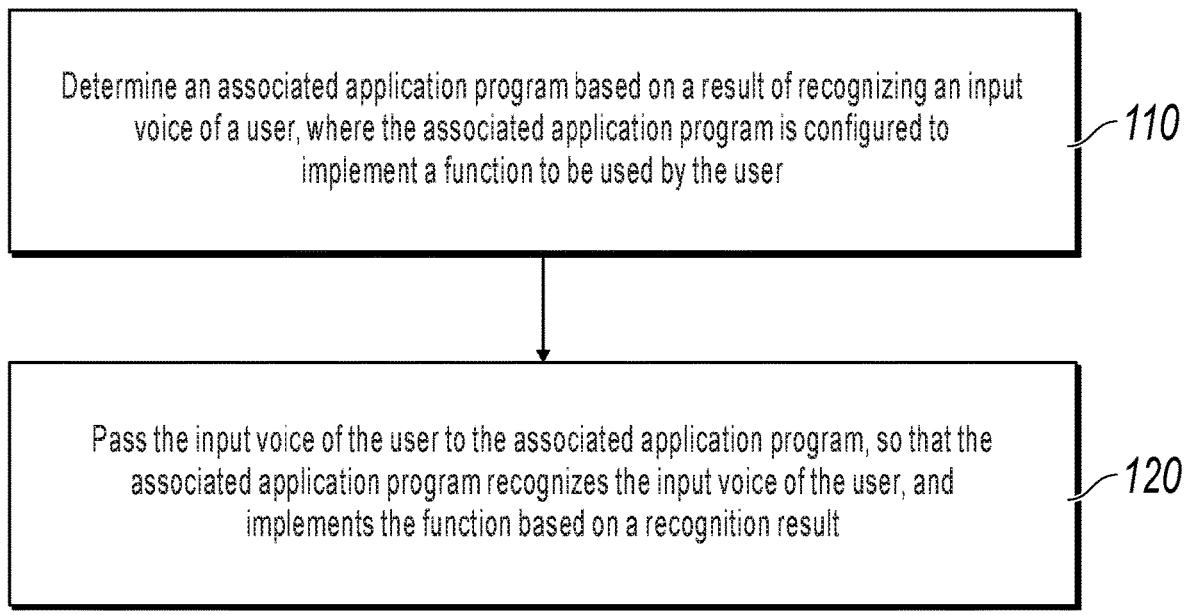
FIG. 1 is a flowchart illustrating a voice function control method applied to a voice assistant of a terminal, according to an implementation of the present application.

In the existing technology, many application programs of a non-voice-assistant type that are installed in a terminal also can receive voice input of a user, recognize and execute a voice instruction of the user, and implement a function to be used by the user. For simplicity, in the following, an application program of a voice assistant type is referred to as a voice assistant, and an application program that is of a non-voice-assistant type and that is configured to implement another function different from the voice assistant is referred to as an application program.

The voice assistant is originally designed to serve as a unified entry for voice interaction with a user, and the voice assistant needs to chat with the user in addition to recognizing instructions of all function types that the user may involve in. Therefore, a lexicon of the voice assistant has a very wide lexical range, and recognition rates of all types of vocabularies need to be considered during optimization of a voice recognition algorithm of the voice assistant. However, an application program usually focuses on implementing several main functions. For example, an application program of a map type focuses on addressing, positioning, and navigation, and an application program of a shopping type focuses on commodities and transactions. When the user uses these application programs, it is basically determined that the user intends to use functions that the application programs focus on. Therefore, a lexical range of a lexicon used for voice recognition in an application program also focuses on a function field that the application program focuses on, and optimization of a voice recognition algorithm also focuses on the function field that the application program focuses on.

Waiting duration from a time when a user sends a voice instruction to a time when a terminal gives a response greatly affects user experience. Therefore, time available for voice recognition is very limited. Within the limited time, in any specific function field, when the voice assistant recognizes a voice that is input by a user because the user intends to use a certain function in the field, in terms of accuracy, it is difficult for the voice assistant to catch up with an application program that belongs to the function field.

For example, in terms of a location name, a lexicon of the Gaode map application program is more comprehensive and accurate than a lexicon of Siri. In addition, due to long-term accumulation with respect to location searching, a recognition algorithm of the Gaode map application program is also more accurate than a recognition algorithm of Siri in terms of location name recognition. In the present application scenario, Siri does not have more reliable data such as location names and locations as references for optimizing the recognition algorithm of Siri.

It can be learned that in the existing technology, that a voice assistant delivers a recognition result to an application program actually means that a party that is not good at certain work completes the work and delivers an inaccurate working result to the other party that is good at the work, and the other party has to complete a task based on the relatively poor working result. Therefore, it is naturally difficult to achieve a good result.

Based on the previous idea, the implementations of the present application provide a new voice function control method. A voice assistant determines, by recognizing an input voice of a user, an associated application program that can implement an intention of the user, and then passes the input voice to the associated application program. The associated application program recognizes the voice and then implements a function to be used by the user. Therefore, the application program executes a user instruction based on the original input voice, so that the application program can implement the function based on its own recognition result rather than an undesired result of the voice assistant. As such, the function required by the user can be implemented more accurately and quickly, to alleviate the problem in the existing technology.

In the implementations of the present application, both a voice assistant and an application program run on a terminal of a user. The voice assistant can run at an operating system layer of the terminal, or can run as an upper-layer application of an operating system. Implementations are not limited. The terminal of the user can be any device that has a voice input function, a calculation function, and a storage function, such as a mobile phone, a tablet computer, a personal computer (PC), a notebook computer, or a server. Implementations are not limited, either.

Figure 2:
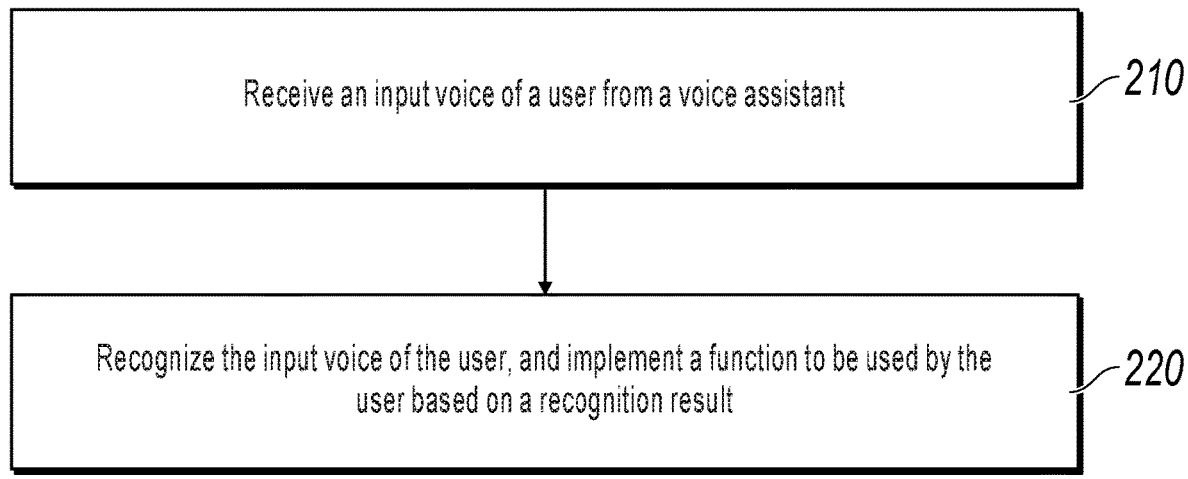
FIG. 2 is a flowchart illustrating a voice function control method applied to an application program of a terminal, according to an implementation of the present application.

In the implementations of the present application, a process in which the voice function control method is applied to a voice assistant is shown in FIG. 1, and a process in which the voice function control method is applied to an application program is shown in FIG. 2.

Step 110: The voice assistant determines an associated application program based on a result of recognizing an input voice of a user, where the associated application program is configured to implement a function to be used by the user.

After receiving the voice input of the user, the voice assistant recognizes the voice of the user. If a user instruction does not involve use of a certain function or if the function to be used by the user can be implemented by the voice assistant, the voice assistant replies to the input of the user or executes the user instruction based on the recognition result. If the recognition result of the voice assistant is that a user needs to use a certain function implemented by an application program, the voice assistant determines the associated application program that implements the function.

The user can specify, in the input voice, an application program that the user wants to use. In this case, the voice assistant can extract an application program name from the result of recognizing the input voice of the user, and use the application program (namely, the application program specified by the user in the input voice) as the associated application program. For example, if the user says "hail a taxi for me with DiDi" to the voice assistant, the voice assistant recognizes the application program name "DiDi", and therefore uses the application program DiDi as the associated application program.

If the user does not specify, in the input voice, an application program that the user wants to use, the voice assistant can determine the function to be used by the user based on the result of recognizing the input voice of the user, and then determine the associated application program from application programs installed in the terminal based on the function to be used by the user. A method for determining, by the voice assistant, the function to be used by the user from the recognition result can be implemented with reference to various existing technologies. For example, several keywords of each function can be predetermined. If a certain function keyword is hit in the result of recognizing the voice of the user, a function that the user wants to use can be known.

A way of determining the associated application program based on the function to be used by the user can be determined based on a demand of an actual application scenario. The following uses two implementations as examples for description.

In a first implementation, after recognizing the function to be used by the user, the voice assistant can use one application program to more application programs that can implement the function to be used by the user and support voice input in the terminal as candidate application programs, and display names of the candidate application programs to the user for selection. After receiving a selection result of the user, the voice assistant determines an application program selected by the user as the associated application program.

In a second implementation, a mapping relationship between a function to be used and an application program can be maintained in the terminal. After recognizing the function to be used by the user, the voice assistant can use an application program that has a mapping relationship with the function to be used by the user as the associated application program. In the previous example in which the function keyword is used to reflect the function to be used by the user, a table of a mapping relationship between a function keyword and an application program can be stored in the terminal. After extracting a function keyword from the result of recognizing the input voice of the user, the voice assistant can use an application program that has a mapping relationship with the function keyword as the associated application program.

In the second implementation, the mapping relationship between a function to be used and an application program can be set and/or modified by the user, or can be generated by the voice assistant or an operating system, or can be generated in both ways. Implementations are not limited in the implementations of the present application. In an example, when inputting a voice, the user can set a mapping relationship between a function to be used and an associated application program (one function to more functions correspond to one application program) in setting items provided by the voice assistant or the operating system. In another example, an application program that is most frequently used by the user to implement a certain function can be used as an application program that has a mapping relationship with the function. If only one application program installed in the terminal can implement a certain function, the application program is used as an application program that has a mapping relationship with the function. If more than one application program installed in the terminal can implement a certain function, the most frequently used application program can be used as an application program that has a mapping relationship with the function based on frequency that is counted by the operating system and at which the user uses each application program that can implement the function. In a third example, in an application program that can implement a certain function, the user can further set the application program to an application program that has a mapping relationship with the function when a voice is input. After receiving a setting instruction of the user, the application program submits a mapping relationship between the application program and the function to be used to the voice assistant. For example, in the Gaode map application program, the user sets the Gaode map application program to be in a mapping relationship with a function keyword "navigation" when a voice is input. In this case, the Gaode map application program submits the setting item to Siri based on the user operation, and Siri stores the mapping relationship and subsequently uses the Gaode map application program as an associated application program based on the mapping relationship when the user inputs a voice "navigate to . . . ".

It should be noted that the previous two ways of determining the associated application program can alternatively be applied in combination. For example, after determining the function to be used by the user, the voice assistant queries the stored mapping relationship between a function and an application program. If the voice assistant can find an application program that has a mapping relationship with the function to be used, the voice assistant determines the associated application program based on the mapping relationship. If the voice assistant cannot find an application program that has a mapping relationship with the function to be used, the voice assistant provides application programs that can implement the function to be used and support voice input in the terminal for the user for selection, and determines the associated application program based on user selection. After the user selection, the user may be requested to set a default associated application program of the function. If the user sets the default associated application program of the function, the voice assistant stores a mapping relationship between the function and the application program set by the user. If the user does not set the default associated application program of the function, the voice assistant can store a mapping relationship between an application program and the function after both a quantity of times the user selects the application program to implement the function and a frequency at which the user selects the application program to implement the function exceed specified thresholds. For example, a table, maintained by Siri, of a mapping relationship between a function and an application program does not include a mapping relationship of a "navigation" function. After the user gives a voice instruction "navigate to . . . " for five times, Siri displays application program names of the Gaode map application program, Baidu map, and Sogou map that are installed in the terminal to the user, and the user chooses to use one application program for navigation. If the user selects the Gaode map application program four times, Siri stores a mapping relationship between the "navigation" function and the Gaode map application program in the mapping relationship table. Then, when the user gives a voice instruction for navigation, Siri directly uses the Gaode map application program as an associated application program.

Step 120: The voice assistant passes the input voice of the user to the associated application program, so that the associated application program recognizes the input voice of the user, and implements the function based on a recognition result.

Step 210: The associated application program receives the input voice of the user from the voice assistant.

After determining the associated application program that can implement the function to be used by the user, the voice assistant opens the associated application program (including starting the associated application program, placing the associated application program in the foreground for running, etc.), and passes the input voice of the user to the associated application program.

Step 220: The associated application program recognizes the input voice of the user, and implements the function to be used by the user based on a recognition result.

The associated application program recognizes the input voice of the user from the voice assistant, and runs service processing logic of the associated application program based on the recognition result, to implement the function to be used by the user. The associated application program can perform voice recognition and function implementation based on the existing technology. Details are omitted here for simplicity.

In an example, the voice assistant can pass the input voice of the user together with its own result of recognizing the input voice of the user to the associated application program. The associated application program recognizes the input voice of the user, and implements the function to be used by the user based on the recognition result of the associated application program and the recognition result from the voice assistant. The recognition result of the voice assistant can be used as a reference for recognizing the voice by the associated application program, to further improve recognition accuracy.

It can be learned that in the implementations of the present application, the voice assistant determines, by recognizing the input voice of the user, the associated application program that can implement the function to be used by the user, and passes the input voice to the associated application program, and the associated application program recognizes the input voice and then executes a user instruction. Therefore, a more accurate voice recognition result of the application program in a function type that the application program belongs to can be used to more accurately and quickly complete the function required by the user, thereby improving voice function control efficiency.

In an application example of the present application, the voice assistant Siri and application programs that can complete various functions are installed in an Apple terminal of a user. Siri stores a table of a mapping relationship between a function keyword and an application program. An example of the mapping relationship table is shown in Table 1.

TABLE 1

| Sequence number | Function keyword | Application program name |
| --- | --- | --- |
| 1 | Navigation | Gaode map |
| 2 | Taxi booking | DiDi |
| 3 | Taxi hailing | DiDi |
| 4 | Transfer | ALIPAY |
| . | . | . |
| . | . | . |
| . | . | . |

Figure 3:
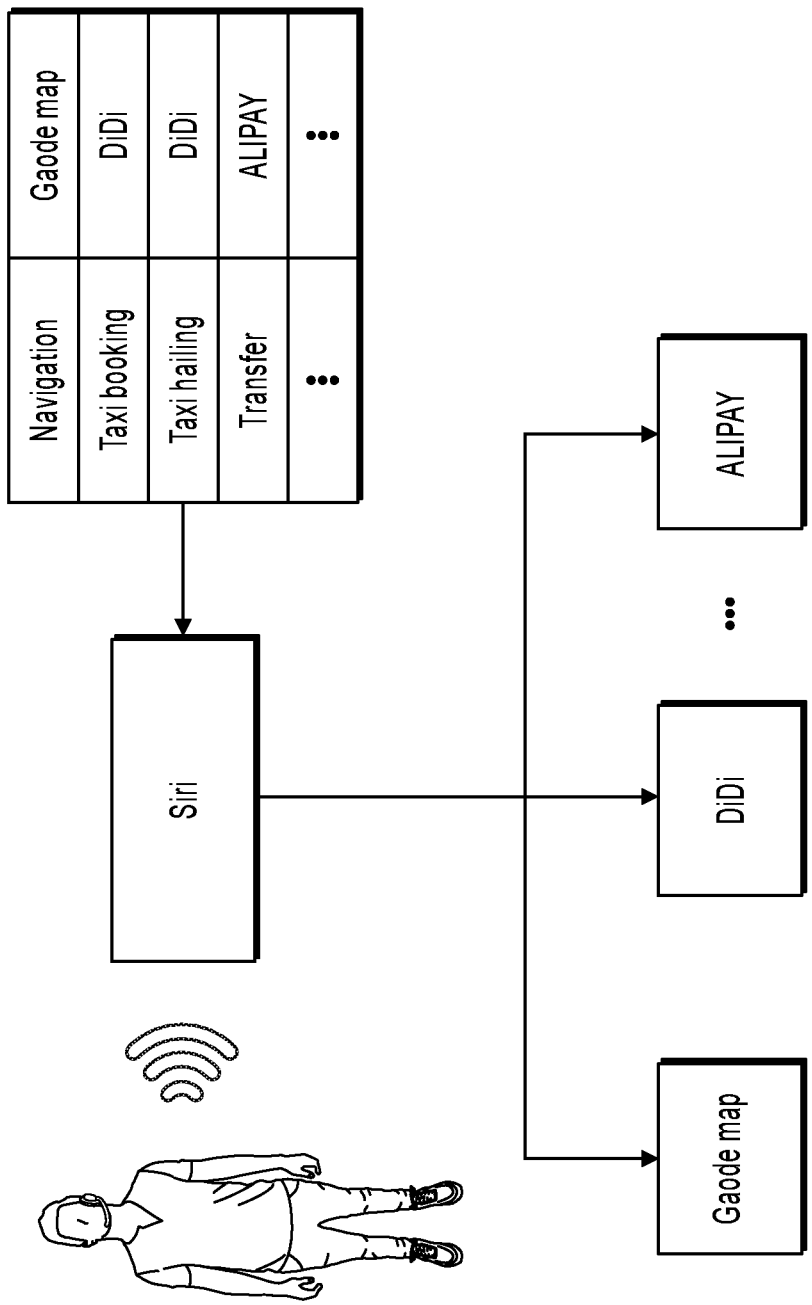
FIG. 3 is a schematic diagram illustrating a working principle of an application example, according to the present application.

A working principle of the present application example is shown in FIG. 3. After receiving an input voice of the user, Siri recognizes the input voice. Assume that a function to be used by the user needs to be implemented by another application program, Siri extracts a function keyword that describes the function to be used by the user from a recognition result, and searches the mapping relationship table based on the function keyword. If Siri finds an application program corresponding to the function keyword, Siri uses the application program as an associated application program. If Siri does not find the function keyword in the table, Siri displays names of all application programs that are installed in the terminal and that can implement the function and support voice input to the user, to request the user to select a wanted application program. Siri uses an application program selected by the user as an associated application program.

Siri places the associated application program in the foreground for running, and transmits the input voice of the user to the associated application program by using an operating system. The associated application program recognizes the input voice of the user, and completes a task specified by the user based on a recognition result and a service process of the associated application program.

For example, the user said "transfer 2000 to Zhang San" to Siri. In this case, Siri recognizes the function keyword "transfer", and finds, from Table 1, that an associated application program is ALIPAY. Siri opens ALIPAY and passes the input voice of the user to ALIPAY. ALIPAY recognizes the input voice, starts a transfer service process, and displays contents such as "recipient: Zhang San" and "transfer amount: 2000" to the user. The transfer can be completed after the user enters a password or completes fingerprint verification.

Figure 4:
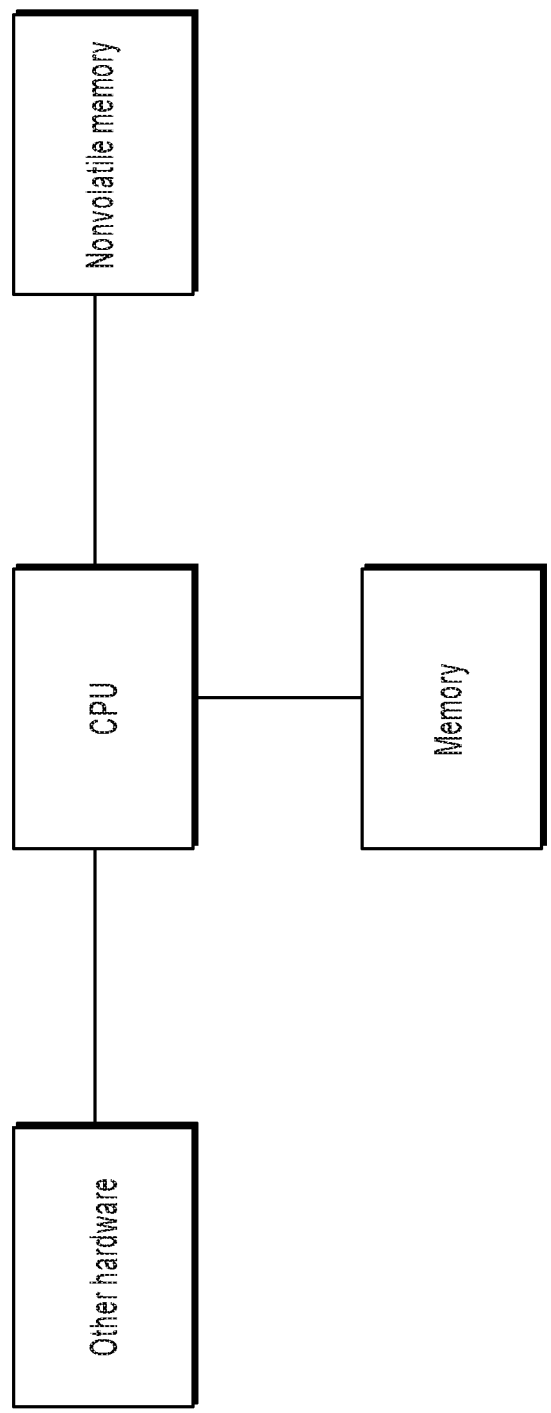
FIG. 4 is a structural hardware diagram illustrating a terminal.

Corresponding to the previous process implementation, the implementations of the present application further provide a voice function control apparatus applied to a terminal voice assistant, and a voice function control apparatus applied to a terminal application program. Both the voice function control apparatuses can be implemented by software, can be implemented by hardware, or can be implemented by a combination of hardware and software. Software implementation is used as an example. As a logical apparatus, the voice function control apparatus is formed by reading a corresponding computer program instruction into a memory by using a central processing unit (CPU) of a terminal. In terms of hardware implementation, in addition to the CPU, the memory, and the nonvolatile memory that are shown in FIG. 4, a terminal that the voice control apparatus is located in usually further includes other hardware such as a chip for sending and receiving radio signals, and/or other hardware such as a card configured to implement a network communication function.

Figure 5:
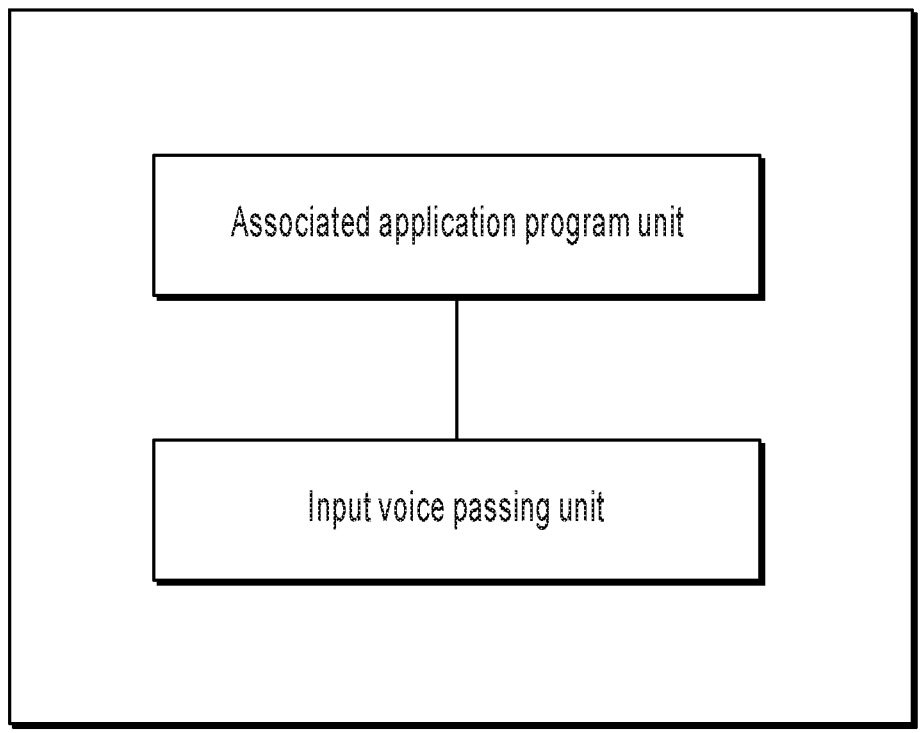
FIG. 5 is a logical structural diagram illustrating a voice function control apparatus applied to a voice assistant of a terminal, according to an implementation of the present application.

FIG. 5 illustrates a voice function control apparatus, according to an implementation of the present application. The voice function control apparatus is applied to a voice assistant of a terminal, and includes an associated application program unit and an input voice passing unit. The associated application program unit is configured to determine an associated application program based on a result of recognizing an input voice of a user, where the associated application program is configured to implement a function to be used by the user. The input voice passing unit is configured to pass the input voice of the user to the associated application program, so that the associated application program recognizes the input voice of the user, and implements the function based on a recognition result.

In an example, a mapping relationship between a function to be used and an application program is maintained in the terminal; and the associated application program unit is configured to determine the function to be used by the user based on the result of recognizing the input voice of the user, and use an application program that has a mapping relationship with the function to be used by the user as the associated application program.

In the previous example, the mapping relationship between a function to be used and an application program includes: a mapping relationship between a function keyword and an application program; and the associated application program unit is configured to extract a function keyword from the result of recognizing the input voice of the user, and use an application program that has a mapping relationship with the function keyword as the associated application program.

In the previous example, the mapping relationship between a function to be used and an application program includes: a mapping relationship, set by the user, between a function to be used and an application program; and/or determining an application program that is most frequently used by the user to implement a function to be used as an application program that has a mapping relationship with the function to be used; and/or a mapping relationship, submitted by a certain application program, between the application program and a function to be used.

Optionally, the associated application program unit is configured to determine the function to be used by the user based on the result of recognizing the input voice of the user, display names of application programs that can implement the function and support voice input to the user for selection, and determine an application program selected by the user as the associated application program.

Optionally, the associated application program unit is configured to extract an application program name from the result of recognizing the input voice of the user, and use an application program specified in the input voice as the associated application program.

Optionally, the input voice passing unit is configured to pass the recognition result and the input voice of the user to the associated application program, so that the associated application program recognizes the input voice of the user, and implements the function based on the recognition result of the associated application program and the recognition result of the voice assistant.

Figure 6:
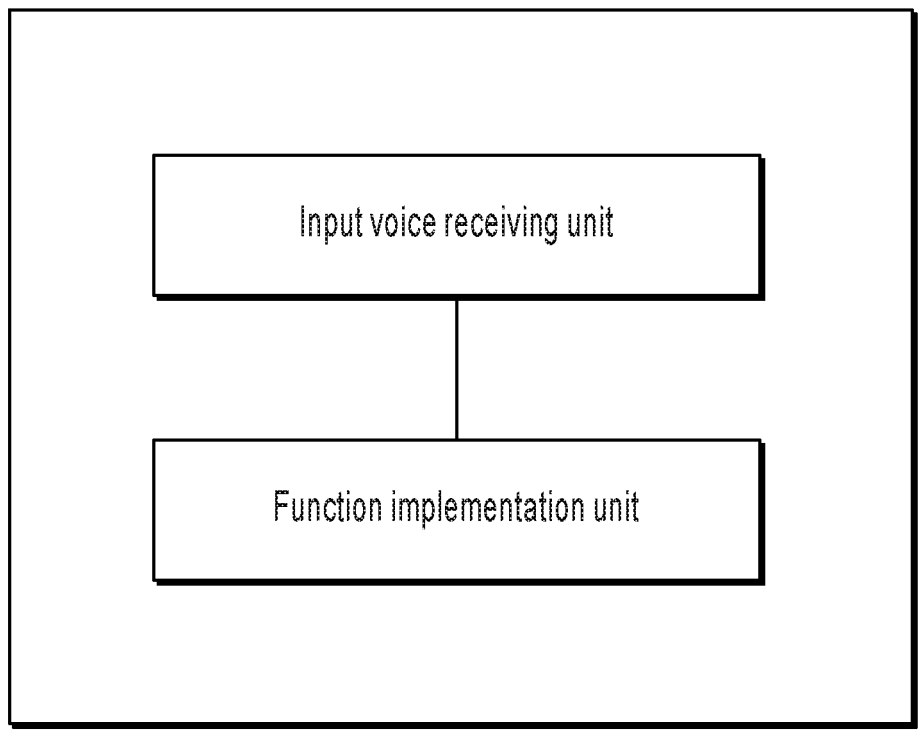
FIG. 6 is a logical structural diagram illustrating a voice function control apparatus applied to an application program of a terminal, according to an implementation of the present application.

FIG. 6 illustrates a voice function control apparatus, according to an implementation of the present application. The voice function control apparatus is applied to a terminal application program configured to implement another function different from a voice assistant, and includes an input voice receiving unit and a function implementation unit. The input voice receiving unit is configured to receive an input voice of a user from a voice assistant. The function implementation unit is configured to recognize the input voice of the user, and implement a function to be used by the user based on a recognition result.

Optionally, the input voice receiving unit is configured to receive the input voice of the user and a result of recognizing the input voice by the voice assistant from the voice assistant; and the function implementation unit is configured to recognize the input voice of the user, and implement the function to be used by the user based on its own recognition result and the recognition result from the voice assistant.

In an example, the voice function control apparatus further includes a mapping relationship submission unit, configured to submit a mapping relationship between the application program and the function to be used to the voice assistant based on a user instruction.

In the previous example, the mapping relationship between the application program and the function to be used includes: a mapping relationship between the application program and a function keyword.

The previous descriptions are merely examples of implementations of the present application, but are not intended to limit the present application. Any modification, equivalent replacement, improvement, etc. made without departing from the spirit and principle of the present application should fall within the protection scope of the present application.

In a typical configuration, a computing device includes one or more processors (CPUs), one or more input/output interfaces, one or more network interfaces, and one or more memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change RAM (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD) or another optical storage, a cassette, a cassette magnetic disk storage or another magnetic storage device, or any other non-transmission medium. The computer storage medium can be configured to store information available to a computing device. As described in the present application, the computer readable medium does not include computer readable transitory media such as a modulated data signal and a carrier.

It is worthwhile to further note that, the terms "include" and "comprise" or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, an optical memory, etc.) that include computer-usable program code.

Figure 7:
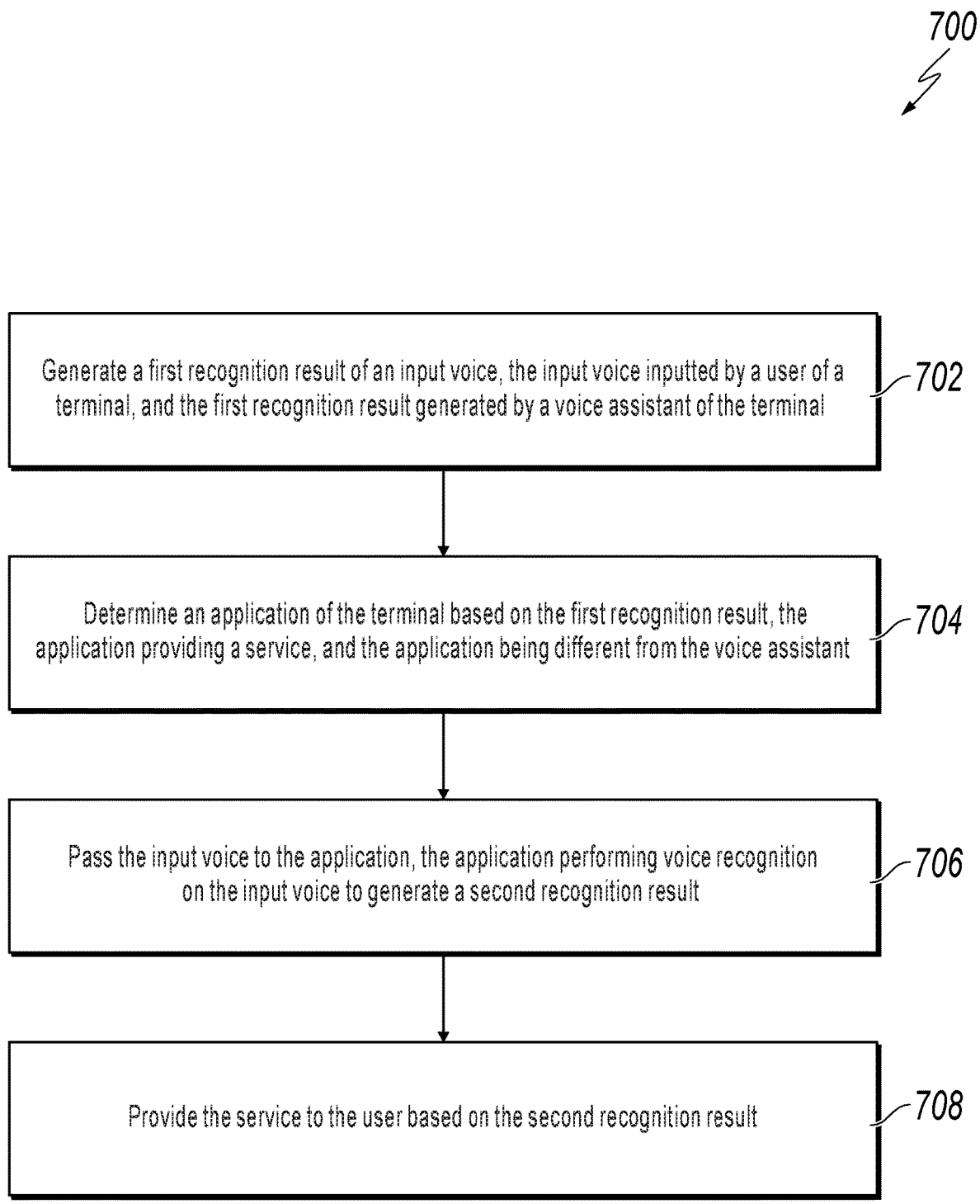
FIG. 7 is a flowchart illustrating an example of a computer-implemented method for voice function control, according to an implementation of the present disclosure.

FIG. 7 is a flowchart illustrating an example of a computer-implemented method 700 for voice function control, according to an implementation of the present disclosure. For clarity of presentation, the description that follows generally describes method 700 in the context of the other figures in this description. However, it will be understood that method 700 can be automatically performed, for example, by any system, environment, software, and hardware, or a combination of systems, environments, software, and hardware, as appropriate. In some implementations, various steps of method 700 can be run in parallel, in combination, in loops, or in any order.

At 702, a first recognition result of an input voice is generated. In some implementations, the input voice is input by a user of a terminal. The first recognition result is generated by a voice assistant of the terminal (such as, SIRI on an iPhone). For example, the user can launch the voice assistant of the terminal to input a voice command. In some implementations, the first recognition result can be a preliminary recognition result. The voice assistant can provide partial recognition of the input voice, not a full recognition of the input voice. For example, the first recognition result can recognize part of the input voice (such as, an application name). From 702, method 700 proceeds to 704.

At 704, an application of the terminal is determined based on the first recognition result. In some implementations, the application provides a service that the user wants to use (such as, a navigation service). In some implementations, the application is different from the voice assistant. For example, the application is not a voice assistant, and is an application that supports voice input. In some implementations, after the determination, the application can be automatically launched. In some implementations, the voice assistant can open the application after the determination.

In some implementations, a mapping relationship between services and applications can be maintained in the terminal. The mapping relationship between services and applications can be a one-to-one or one-to-many relationship. For example, an application can be associated with one or more services that the application can provide in the mapping relationship between services and applications. In some implementations, a service can be associated with one or more applications in the mapping relationship between services and applications. The service that the user wants to use can be determined based on the first recognition result. Then, the application can be determined based on the service and the mapping relationship between services and applications. In some implementations, the mapping relationship between services and applications can be set by the user or submitted by a particular application (such as, the application or a different application). In some implementations, for each particular service in the mapping relationship between services and applications, the corresponding application can be an application that is most frequently used by the user for the particular service.

In some implementations, the mapping relationship between services and applications can include a mapping relationship between function keywords and applications. For example, a function keyword (such as, navigation, taxi, or transfer) can be extracted from the first recognition result. Then, the application can be determined based on the function keyword and the mapping relationship between function keywords and applications. For example, if the extracted function keyword is transfer, then the determined application can be ALIPAY.

In some implementations, the service that the user wants to use can be determined based on the first recognition result. Multiple applications of the terminal can be displayed. Each application of the multiple applications can provide the service, and support voice input. The application can be determined based on a user selection. For example, the user can select one application from the displayed multiple applications as the determined application.

In some implementations, an application name can be extracted from the first recognition result. Then, the application can be determined based on the application name. From 704, method 700 proceeds to 706.

At 706, the input voice is passed to the application. The application can perform voice recognition on the input voice to generate a second recognition result. In some implementations, both the first recognition result and the input voice can be passed to the application. The application can perform voice recognition on the first recognition result and the input voice to generate the second recognition result. For example, the application can perform voice recognition on the input voice and use the first recognition result as a reference to improve recognition accuracy. In some implementations, the application can provide a full recognition of the input voice. From 706, method 700 proceeds to 708.

At 708, the service is provided to the user based on the second recognition result. In some implementations, the second recognition result can be more accurate than the first recognition result. For example, based on the second recognition result, not the first recognition result, the application can provide the service to the user in response to the input voice of the user. After 708, method 700 can stop.

Voice control can be supported by, for example, a mobile device. Normally, a user first opens a voice assistant on the mobile device, and then uses voice input to activate a service. In some cases, the voice assistant performs voice recognition on the whole voice input to extract information, invokes an application, and provides the extracted information to the application for processing. However, the voice assistant may not be able to accurately identify the input voice in various service scenarios. As a result, the application may not be able to provide the service the user wants based on inaccurate information from the voice assistant. The subject matter described in this specification provides a simple and accurate voice function control method. For example, a voice assistant can perform a preliminary voice recognition on an input voice. Based on the preliminary voice recognition, an application can be determined. The input voice can be passed to the application. The application can perform a voice recognition by itself on the input voice instead of relying on the voice assistant. In doing so, the application can provide a more accurate voice recognition than the voice assistant in a service scenario of the application. As a result, the application can provide the service the user wants, thereby improving voice function control accuracy and efficiency, as well as user experience using voice control function of the mobile device.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    generating, by a voice assistant of a terminal, a first recognition result of an input voice, wherein the input voice is input by a user of the terminal;
    determining, by the voice assistant, an application of the terminal based on the first recognition result, wherein the application provides a service, the application is different from the voice assistant, and determining the application of the terminal based on the first recognition result comprises:
        determining the service that the user wants to use based on the first recognition result;

in response to determining the service, displaying a plurality of applications of the terminal, wherein each application of the plurality of applications provides the service and supports voice input; and determining the application from the plurality of applications based on a user selection;

passing, by the voice assistant, the first recognition result and the input voice to the application;

generating, by the application, a second recognition result by performing voice recognition on the input voice passed to the application, wherein the second recognition result is more accurate than the first recognition result in providing the service; and providing, by the application, the service to the user based on the second recognition result and the first recognition result.

2. The computer-implemented method of claim 1, wherein a mapping relationship between services and applications is maintained in the terminal, and determining the application of the terminal based on the first recognition result comprises:

determining the service that the user wants to use based on the first recognition result; and determining the application based on the service and the mapping relationship between services and applications.

3. The computer-implemented method of claim 2, wherein at least one of:

the mapping relationship between services and applications is set by the user;

in the mapping relationship between services and applications, for each particular service, a corresponding application is an application that is most frequently used by the user for the particular service; or the mapping relationship between services and applications is submitted by a particular application.

4. The computer-implemented method of claim 1, wherein a mapping relationship between services and applications is maintained in the terminal, the mapping relationship between services and applications includes a mapping relationship between function keywords and applications, and determining the application of the terminal based on the first recognition result comprises:

extracting a function keyword from the first recognition result; and determining the application based on the function keyword and the mapping relationship between function keywords and applications.

5. The computer-implemented method of claim 1, wherein determining the application of the terminal based on the first recognition result comprises:

extracting an application name from the first recognition result; and determining the application based on the application name.

6. The computer-implemented method of claim 1, wherein the application performs voice recognition on the first recognition result and the input voice to generate the second recognition result.

7. A non-transitory, computer-readable medium storing one or more instructions executable by a computer system to perform operations comprising:

generating, by a voice assistant of a terminal, a first recognition result of an input voice, wherein the input voice is input by a user of the terminal;

determining, by the voice assistant, an application of the terminal based on the first recognition result, wherein the application provides a service, the application is different from the voice assistant, and determining the application of the terminal based on the first recognition result comprises:

determining the service that the user wants to use based on the first recognition result;

in response to determining the service, displaying a plurality of applications of the terminal, wherein each application of the plurality of applications provides the service and supports voice input; and determining the application from the plurality of applications based on a user selection;

passing, by the voice assistant, the first recognition result and the input voice to the application;

generating, by the application, a second recognition result by performing voice recognition on the input voice passed to the application, wherein the second recognition result is more accurate than the first recognition result in providing the service; and providing, by the application, the service to the user based on the second recognition result and the first recognition result.

8. The non-transitory, computer-readable medium of claim 7, wherein a mapping relationship between services and applications is maintained in the terminal, and determining the application of the terminal based on the first recognition result comprises:

determining the service that the user wants to use based on the first recognition result; and determining the application based on the service and the mapping relationship between services and applications.

9. The non-transitory, computer-readable medium of claim 8, wherein at least one of:

the mapping relationship between services and applications is set by the user;

in the mapping relationship between services and applications, for each particular service, a corresponding application is an application that is most frequently used by the user for the particular service; or the mapping relationship between services and applications is submitted by a particular application.

10. The non-transitory, computer-readable medium of claim 7, wherein a mapping relationship between services and applications is maintained in the terminal, the mapping relationship between services and applications includes a mapping relationship between function keywords and applications, and determining the application of the terminal based on the first recognition result comprises:

extracting a function keyword from the first recognition result; and determining the application based on the function keyword and the mapping relationship between function keywords and applications.

11. The non-transitory, computer-readable medium of claim 7, wherein determining the application of the terminal based on the first recognition result comprises:

extracting an application name from the first recognition result; and determining the application based on the application name.

12. The non-transitory, computer-readable medium of claim 7, wherein the application performs voice recognition on the first recognition result and the input voice to generate the second recognition result.

13. A computer-implemented system, comprising:
one or more computers; and one or more computer memory devices interoperably coupled with the one or more computers and having tangible, non-transitory, machine-readable media storing one or more instructions that, when executed by the one or more computers, perform one or more operations comprising:
  generating, by a voice assistant of a terminal, a first recognition result of an input voice, wherein the input voice is input by a user of the terminal;
  determining, by the voice assistant, an application of the terminal based on the first recognition result, wherein the application provides a service, the application is different from the voice assistant, and determining the application of the terminal based on the first recognition result comprises:
    determining the service that the user wants to use based on the first recognition result;
    in response to determining the service, displaying a plurality of applications of the terminal, wherein each application of the plurality of applications provides the service and supports voice input; and
    determining the application from the plurality of applications based on a user selection;
  passing, by the voice assistant, the first recognition result and the input voice to the application;
  generating, by the application, a second recognition result by performing voice recognition on the input voice passed to the application, wherein the second recognition result is more accurate than the first recognition result in providing the service; and
  providing, by the application, the service to the user based on the second recognition result and the first recognition result.

14. The computer-implemented system of claim 13, wherein a mapping relationship between services and applications is maintained in the terminal, and determining the application of the terminal based on the first recognition result comprises:

determining the service that the user wants to use based on the first recognition result; and
  determining the application based on the service and the mapping relationship between services and applications.

15. The computer-implemented system of claim 14, wherein at least one of:
  the mapping relationship between services and applications is set by the user;
  in the mapping relationship between services and applications, for each particular service, a corresponding application is an application that is most frequently used by the user for the particular service; or
  the mapping relationship between services and applications is submitted by a particular application.

16. The computer-implemented system of claim 13, wherein a mapping relationship between services and applications is maintained in the terminal, the mapping relationship between services and applications includes a mapping relationship between function keywords and applications, and determining the application of the terminal based on the first recognition result comprises:
  extracting a function keyword from the first recognition result; and
  determining the application based on the function keyword and the mapping relationship between function keywords and applications.

17. The computer-implemented system of claim 13, wherein determining the application of the terminal based on the first recognition result comprises:
  extracting an application name from the first recognition result; and
  determining the application based on the application name.

* * * * *